US008971591B2

(12) United States Patent
Kovtun et al.

(10) Patent No.: US 8,971,591 B2
(45) Date of Patent: Mar. 3, 2015

(54) 3D IMAGE ESTIMATION FOR 2D IMAGE RECOGNITION

(71) Applicant: Google Technology Holdings LLC, Mountain View, CA (US)

(72) Inventors: Ivan Kovtun, Kyiv (UA); Volodymyr Kyyko, Los Angeles, CA (US); Yuriy S. Musatenko, Kyiv (UA); Michael Jason Mitura, Carrollton, TX (US); Laurent Gil, San Francisco, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 249 days.

(21) Appl. No.: 13/709,568

(22) Filed: Dec. 10, 2012

(65) Prior Publication Data
US 2013/0182918 A1 Jul. 18, 2013

Related U.S. Application Data

(60) Provisional application No. 61/569,171, filed on Dec. 9, 2011.

(51) Int. Cl.
  *G06K 9/00* (2006.01)
  *G06K 9/62* (2006.01)
(52) U.S. Cl.
  CPC ........ *G06K 9/00302* (2013.01); *G06K 9/00288* (2013.01); *G06K 9/6255* (2013.01)
  USPC ........... 382/118; 382/115; 382/116; 382/117; 382/119; 382/120; 382/121; 382/122; 382/123; 382/124; 382/125; 382/126; 382/127

(58) Field of Classification Search
  CPC .......... G06K 9/00268; G06K 9/00234; G06K 9/00248; G06K 9/00261; G06K 9/00288; G06K 9/00275; H04N 1/00127; H04N 1/00323
  USPC .................................................. 382/115–127
  See application file for complete search history.

(56) References Cited

U.S. PATENT DOCUMENTS

2011/0116690 A1* 5/2011 Ross et al. ..................... 382/118

OTHER PUBLICATIONS

John See et al.: "Exempler extraction using spatio-temporal hierarchical agglomerative clustering for face recognition in video", Computer Vision (ICCV), 2011 IEEE International Conference on, IEEE, Nov. 6, 2011, all pages.
Zhou S K et al.: "Multiple-exemplar discriminant analysis for face recognition", Pattern Recognition, 204. ICPR 2004. Proceedings of the 17th International Conference on Cambridge, UK Aug. 23-26, 2004, Piscataway, NJ, USA, IEEE, Los Alamitos, CA, USA, vol. 4, Aug. 23, 2004, all pages.

(Continued)

*Primary Examiner* — Mike Rahmjoo
(74) *Attorney, Agent, or Firm* — Morris & Kamlay LLP

(57) ABSTRACT

A server determines a plurality of faceprints representing a plurality of users to be recognized at a client device. Each faceprint contains a number of reference images for a given user that are used to recognize facial images of the user detecting in media captured at the client device. The faceprints delivered to the client device are determined for the client device based on the users likely to be detected in images captured at the client device. The reference images with a given faceprint delivered to the client device are selected by the server based on their recognition value in identifying the users likely to be detected in images captured at the client device.

18 Claims, 5 Drawing Sheets

(56) References Cited

OTHER PUBLICATIONS

Volker Kruger et al.: "Exemplar-Based Face Recognition from Video", In Proc. ECCV2002—7th European Conference on Computer Vision May 1, 2002, all pages.

Castrillon-Santana M et al.: "Face Exemplars Selection from Video Streams for Online Learning", Computer and Robot Vision, 2005. Proceedings. The 2nd Canadian Conference on Victoria, BC, Canada May 9-11, 2005, Piscataway, NJ, USA, IEEE, May 9, 2005, all pages.

Murphy-Chutorian E et al.: "Head Pose Estimation in Computer Vision: A Survey", Transactions on Pattern Analysis and Machine Intelligence, IEEE, Piscataway, USA, vol. 31, No. 4, Apr. 1, 2009, all pages.

Sim T et al.: "Combining Models and Exemplars for Face Recognition: An Illuminating Example", Proceedings of CVPR Workshop on Models and Exemplars, XX, XX, Jan. 1, 2001, all pages.

Georghiades A S et al.: "From Few to many: generative models for recognition under variable pose and illumination", Automatic Face and Gesture Recognition, 2000, Proceedings. Fourth IEEE International Conference on Grenolble, France Mar. 28-30, 2000, Los Alamitos, CA, USA, IEEE Compt. Soc, US, Mar. 28, 2000, all pages.

Silvio Savarese et al.: "View Synthesis for Recognizing Unseen Poses of Object Classes", Oct. 12, 2008, Computer Visison A ECCV 2008; [Lecuture Notes in Computer Science], Springer Berlin Heidelberg, Berlin, Heidelberg, all pages.

Zhang X et al.: "Face recognition across pose: A review", Pattern Recognition, Elsevier, GB, vol. 42, No. 11, Nov. 1, 2009, all pages.

Patent Cooperation Treaty, International Search Report and Written Opinion of the International Searching Authority for International Application No. PCT/US2012/068742, May 6, 2013, 17 pages.

\* cited by examiner

3D IMAGE ESTIMATION FOR 2D IMAGE RECOGNITION

CROSS REFERENCE TO RELATED APPLICATIONS

This application claims the benefit of U.S. Provisional Application No. 61/569,168, filed Dec. 9, 2011, and U.S. Provisional Application No. 61/569,171, filed Dec. 9, 2011 which is incorporated by reference herein in its entirety.

FIELD OF ART

The disclosure relates to the field of facial image comparisons and facial recognition.

BACKGROUND

When a user chooses to upload media content via a network from their portable device, e.g., to a website or another user's device, the user oftentimes performs manual facial and object association operations and provides a selection of which users should receive or be allowed to view the media content. For example, the user may annotate, categorize or otherwise organize images and videos through an online media sharing server to share media with other users, which may be notified through the service that media is available for viewing if the user tags them. Oftentimes, however, users do not have the time or the energy to manually perform these operations. Through automation of facial and object recognition, the user's time spent categorizing, annotating, tagging, etc. may be minimized.

However, media, such as video and image, have been difficult to apply recognition techniques to on mobile devices. Some of the difficulties relate to the computational complexity of measuring the differences between the video objects. Faces and objects in these video objects are often affected by factors such as differences in brightness, positioning and expression. These difficulties are compounded by large corpuses of reference images and the large number of comparisons required for accurate recognition results.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1:
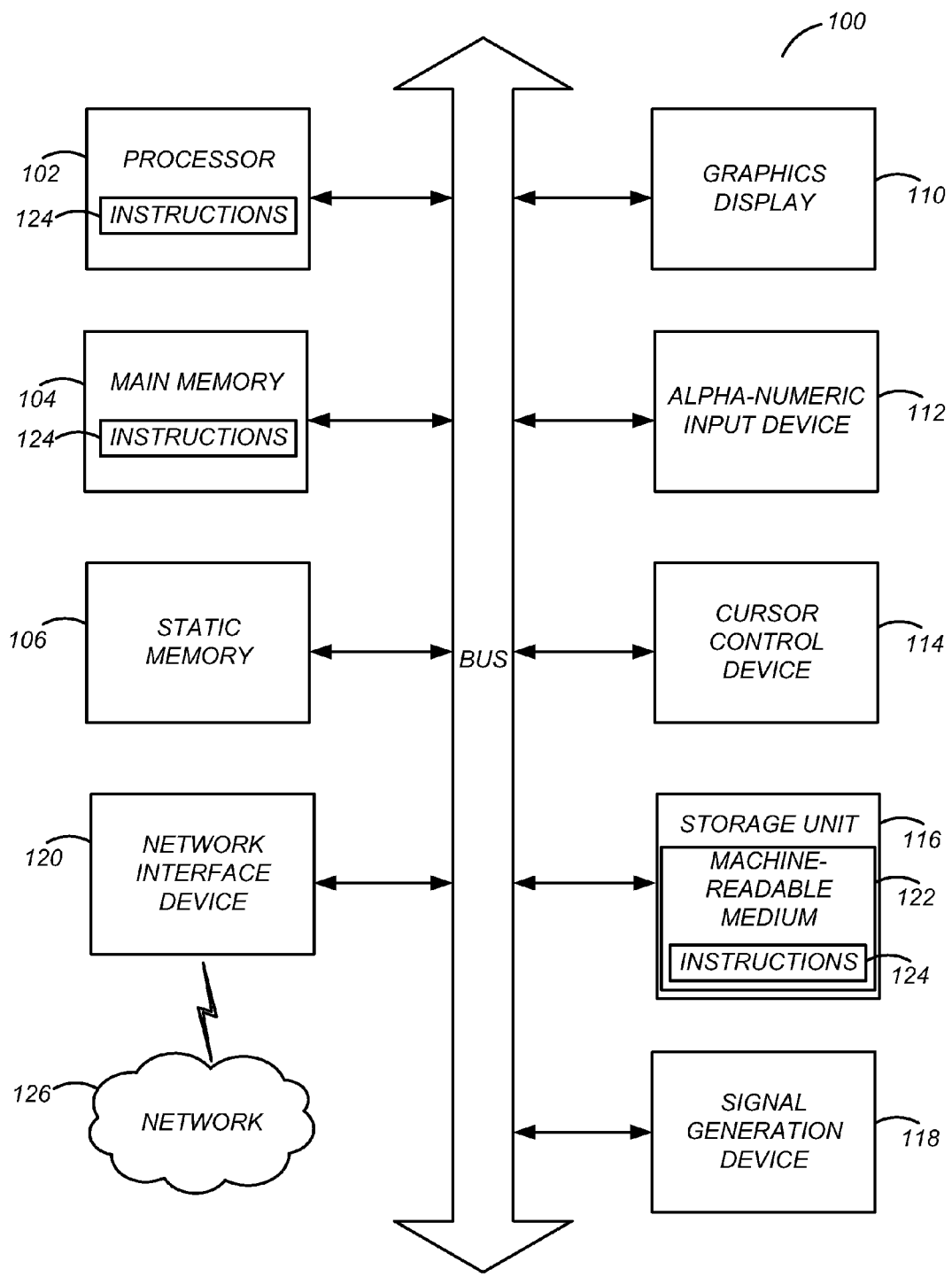
FIG. 1 illustrates one example embodiment of components of an example machine able to read instructions from a machine-readable medium and execute them in a processor (or controller).

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

To recognize a facial image detected in media such as image and video, the detected facial image is compared with a number of reference images having known identities. A comparison resulting in the shortest distance (i.e., highest similarity) between a given reference image and the detected image is compared to a predetermined threshold. Distances greater than the threshold reject the comparison as recognizing the detected image and distances less than the threshold recognize the detected image as having the identity of the reference image. In order to optimize the recognition of facial images at a client device, the number of comparisons required for obtaining a result and/or computational intensity of the comparisons is preferably reduced. Optimizing these factors enables the client device to decrease the time and/or processing power required to perform recognition, thus providing faster results for the user without diminishing usability of battery powered devices.

In an embodiment, a server delivers a set of faceprints to the client device that optimize facial image recognition performed at the client device. The server may optimize the recognition of facial images at a client device by reducing the number of comparisons required for the client device to obtain a recognition result in captured media. The server identifies a subset of users having associated faceprints that are likely to appear in images captured/uploaded by the client device. Accordingly, the server delivers faceprints for only the subset of users to the client device.

The server may identify the subset of users through an analysis of images associated with the client device and users of the client device. Specifically, the some embodiments, the server may retrieve the images from a social network service indicating the identities of users appearing with the user and in images captured by the user with the client device.

Additionally, the server may optimize the selection of reference images used for performing recognition of the users. Specifically, the server may select a reference image for use in identifying a user based on the uniqueness of the reference image when compared to with other reference images used to perform recognitions on the client device. The server may represent the uniqueness of the reference image based on a distance to other reference images representing other users on the client device. The greater the distance between the reference images representing different people, the more the reference images may be compressed prior to a distance calculation or compared using less computationally intensive calculations.

It is contemplated that with increasing processing capability, a client device may perform the above described operations of the server.

Computing Machine Architecture

FIG. 1 is a block diagram illustrating components of an example machine able to read instructions from a machine-readable medium and execute them in a processor (or controller). Specifically, FIG. 1 shows a diagrammatic representation of a machine in the example form of a computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client device machine in a server-client device network environment, or as a peer machine in a peer-to-peer (or distributed) network environment.

The machine may be a server computer, a client device computer, a personal computer (PC), a tablet PC, a set-top box (STB), a personal digital assistant (PDA), a cellular or mobile telephone, a smartphone, an Internet or web appliance, a wearable computer, a network router, switch or bridge, or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 100 includes one or more processors 102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, and a static memory 106, which are configured to communicate with each other via a bus 108. The computer system 100 may further include graphics display unit 110 (e.g., a plasma display panel (PDP), organic light emitting diodes (OLED) (including AMOLED and super-AMOLED types), a liquid crystal display (LCD), a projector, or a cathode ray tube (CRT)). The computer system 100 may also include alphanumeric input device 112 (e.g., a keyboard), a cursor control device 114 (e.g., a mouse, a trackball, a joystick, a motion sensor, or other pointing instrument), a storage unit 116, a signal generation device 118 (e.g., a speaker), and a network interface device 120, which also are configured to communicate via the bus 108. In addition, a voice analyzer or facial feature recognizer may be used as an input device in place of alphanumeric input device 112.

The storage unit 116 includes a machine-readable medium 122 on which is stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media. The instructions 124 (e.g., software) may be transmitted or received over a network 126 via the network interface device 120.

While machine-readable medium 122 is shown in an example embodiment to be a single medium, the term "machine-readable medium" should be taken to include a single medium or multiple media (e.g., a centralized or distributed database, or associated caches and servers) able to store non-transitory data or instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

Example Environment for Creating and Optimizing Faceprints

The recognition of an unknown facial image usually is performed via a comparison of an incoming facial image with a plurality of reference facial images stored in a database. Often, input facial images and stored reference images are not mutually matched quite enough to provide a fast recognition result. For example, an input facial image may have arbitrary spatial orientation, scale, lighting condition, contrast, etc. that deviate from the reference images. Additionally, the quality and orientation of images stored in the database may be not fitted enough and their number too great such that it is difficult to provide fast real-time comparisons with the input images, especially using portable devices.

According to one embodiment, creation, processing and managing of a faceprint comprising a set of reference images for identifying facial images of a particular person or object is performed by a faceprint server. The faceprint server creates and optimizes faceprints of persons to be recognized at a portable device using images accessed over machine readable medium and/or network according to the methodologies discussed in details below.

Figure 2:
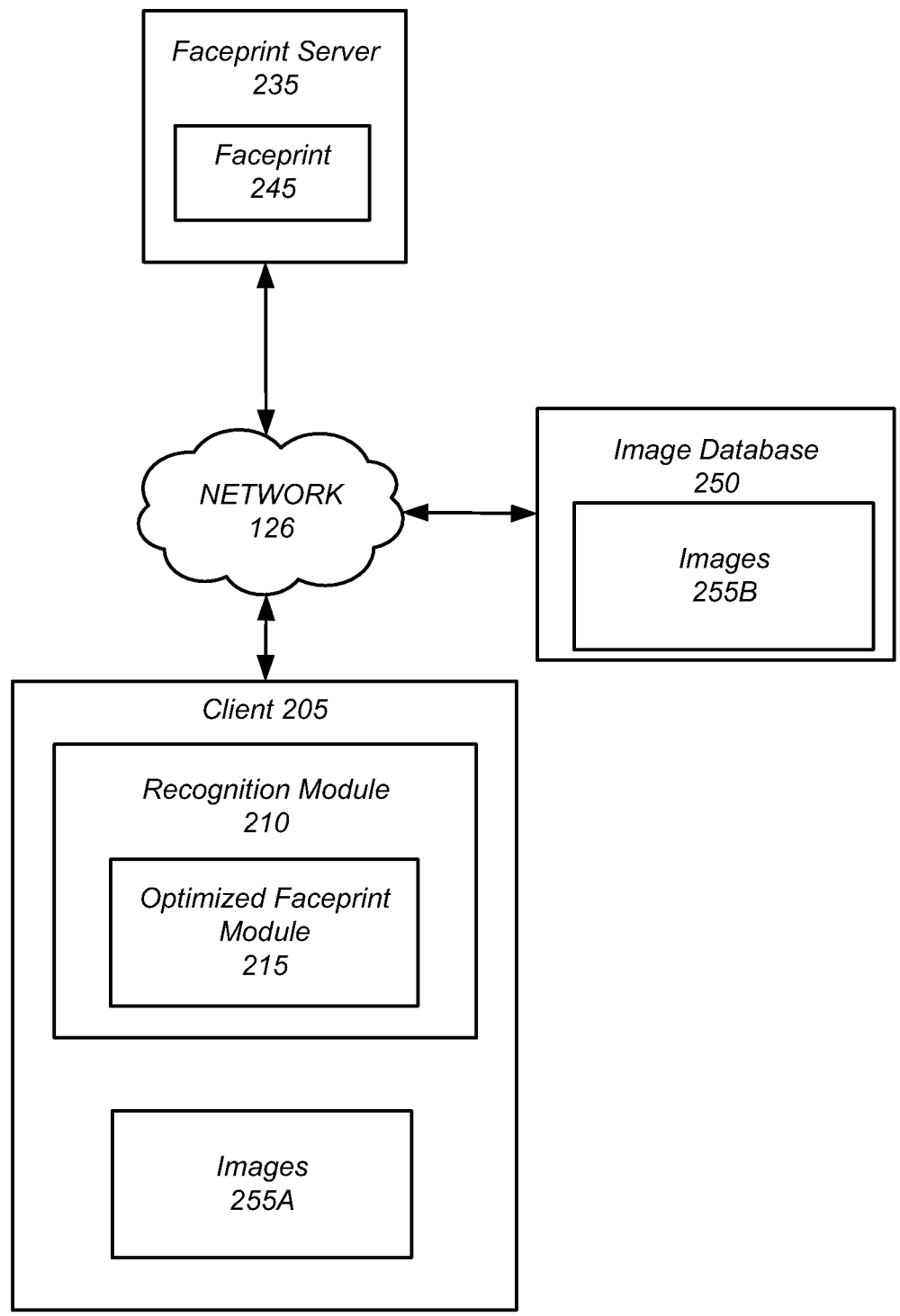
FIG. 2 is a block diagram illustrating an environment for producing a faceprint according to one example embodiment.

FIG. 2 is a high-level block diagram illustrating an environment 200 for producing a faceprint of a person according to one example embodiment. As shown, the environment 200 includes a network 126 connecting an image database 250, a faceprint server 235 and a client device 205. While only one faceprint server 235, image database 250 and client device 205 are shown in FIG. 2 for clarity, embodiments can have multiple servers 235, databases 250 and/or client devices 205. The server 235, database 250 and client devices e.g., 205, may be embodied as machines as described in FIG. 1.

The network 126 represents the communication pathway between client devices 205 and the servers 235, 250. In one example embodiment, the network 126 uses standard communications technologies and/or protocols and can include the Internet. Thus, the network 126 can include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 126 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 126 can be represented using technologies and/or formats including the hypertext markup language (HTML), the extensible markup language (XML), JavaScript, VBScript, FLASH, the portable document format (PDF), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities on the network 126 can use custom and/or dedicated data communications technologies instead of, or in addition to, the ones described above.

Image database 250 is a computer or other electronic device used to house images 255B. In the illustrated embodiment, the image database 250 is represented as a single entity for clarity, however, in other embodiments many other sources such as websites and other client devices 205 may contain an image database 250 accessible over network 126. For example, the image database 250 may house images 255B a particular user has uploaded to a social network. In another example, the image database 250 may house a personal library of images 255B external from the client device 205. The image database 250 provides the corpus of images 255B to the faceprint server 235 and the client device 205 for construction of faceprints.

The images 255 stored in the image database 250 and client device 205 may include still images such as photographs or video comprised of video frames. Additionally, an image, as referred to herein, includes all of or a portion of a still photograph or a video frame extracted from a video stream or video file. Depending on the source, different processing methods may be used to isolate images within media content.

The client device 205 is a computer or other electronic device used by one or more users to execute applications for performing various activities. For example the client device 205 can be a desktop, notebook, wearable computer or tablet computer, a mobile telephone, a gaming device, a digital camera or television set-top box. The applications executed by the client device 205 may include web browsers, word processors, media players, gaming applications, virtual reality applications and services, spreadsheets, image processing applications, security software, etc. As noted above, the client device 205 may be configured as a machine as set forth in FIG. 1.

In the illustrated embodiment, the client device 205 includes a recognition module 210 for recognizing faces in images 255A collected by the client device. These recognitions may be performed in real-time as image data is presented to the user (e.g., via the display of a digital camera, mobile phone, etc.) or as a post-processing feature once an image is captured to identify faces contained therein. In one example embodiment, the recognition module 210 detects the presence of faces in images. To identify, or recognize, the person or object associated with the detected face, the detected face is compared to known reference images. For example, the recognition module 210 may compute a distance between the detected face and a given reference image to perform a comparison. The comparison producing the smallest distance (highest similarity) between the images recognizes the detected face as that of the reference image used in the comparison. However, if the smallest distance is greater than a threshold level of similarity for a positive recognition, the detected image is unrecognized.

Depending on the embodiment, the client device 205 may include dedicated hardware to accelerate the recognition process. For example, the client device 205 may include one or more dedicated digital signal processing (DSP) blocks for calculating discrete cosine transforms (DCTs), motion fields, affine transformations, fast Fourier transforms (FFTs), for example, as described in co-pending U.S. application Ser. No. 13/706,370, "Motion Aligned Distance Calculations for Image Comparisons" filed Dec. 6, 2012, which is incorporated by reference herein in its entirety, and/or other image normalization and/or processing functions. In some embodiments, the above processes may be implemented at processor 102 with additional instruction sets and/or accelerations. In other embodiments, no hardware accelerations are provided specifically for performing facial comparisons.

The faceprint server 235 generates faceprints 245 for use in recognition, for example, as performed by the recognition module 210 at the client device 205. As noted above, the server 235 may be configured as a machine as set forth in FIG. 1. The faceprint server 235 accesses the image database 250 over the network 126 to retrieve images 255B. The faceprint server 235 uses the retrieved images 255B to generate faceprints 245 that, in turn, may be used by the recognition module 210 to identify faces detected in images 255A captured at the client device 205. In some embodiments, the faceprint server 235 provides the recognition module 210 to the client device 205 for using generated faceprints 245.

In one example embodiment, the faceprint server 235 retrieves the images 255B from an image database 250 associated with a social network. The social network may include a social graph that describes user accounts and the images 255B associated with the user in the social network. Oftentimes, users associate their social networking user account(s) with their client device 205 to upload captured images 255A to the image database 250 of the social network. The faceprint server 235 may also retrieve images 255A from a client device, e.g., 205, associated with one or more users. The social graph may also include information such as annotations, tags, categories, etc., associated with each image 255B that identify particular users in the social network. Tagged users often appear in the image in which they are tagged or uploaded the image.

For the purposes herein, a user may be a person or entity to which a social networking profile and/or client device, e.g., 205, is associated with. For example, an entity may be a realistic computer-generated imagery character or other non-human (e.g., a dog or a car) having an identifiable set of facial features (e.g., eyes, nose, mouth, profile, size etc., for animate objects or similarly, a frontal view or profile including headlights, badge, grille, etc., for inanimate objects).

Once the faceprint server 235 accesses one or more of the above sources to attain a user's (or plurality of users') images 255 or subsection thereof, the faceprint server 235 analyzes the retrieved images 255 to determine collections of images associated with a particular user. From hereon, a variety of embodiments are described in the context of human faces, however, as explained above, these methods may apply to other entities having recognizable features.

In some embodiments, the images 255 retrieved by the faceprint server 235 are associated with a person, or number of persons. For example, one or more persons may be tagged in an image 255. Further, a unique identifier (ID) may be associated with a tag for a person. For example, on a social networking site, users "tag" other users in images they appear in by associating other users' unique IDs (and therefore the user's profile) with an image. In other embodiments, a unique ID may represent an object that may be tagged in image 255. For example, the user may tag their "FORD MUSTANG" in an image 255 to associate the image with a fan page for the car. The tags may specifically point out (e.g., surround, box in, outline, etc.) the tagged subject in the image 255. In one example embodiment, the faceprint server 235 determines whether tagged images 255 and/or the tagged areas within the images 255 contain faces. The faceprint server 235 may then associate the detected face with the unique ID indicated by the tag.

Additionally, in some embodiments the faceprint server 235 may determine whether the detected face is of an expected type to eliminate false positives. For example, if the unique ID is associated with a person, images with tags associating the same unique ID with a dog or house may be filtered to avoid further processing. Likewise, if the unique ID (e.g., for a group) is associated with a specific model of car, tagged areas lacking the features of that make or model of the car may be filtered. Thus, the faceprint server 235 may implement initial filters to detect whether the type of face or object expected in the image 255 or tagged region within the image is present before continuing with addition processing.

Once a face and an associated unique ID are determined from an image 255, the facial image may be localized and extracted (e.g. the localized image data is used) for processing as a faceprint candidate to represent the unique ID, e.g., the person in the image. In one example embodiment, the faceprint candidate is a normalized facial image. Normalizing facial images features, such as orientation, size, position, lighting, etc., allows consistent comparisons between images to determine differences and/or similarities between them. Embodiments of feature orientation and normalization techniques described in co-pending U.S. application Ser. No. 13/706,370, "Motion Aligned Distance Calculations for Image Comparisons" may be used in conjunction the embodiments described herein.

In one example embodiment, depending on the initial orientation of the face, the image may be processed, normalized and/or formatted to a normalized facial orientation. For example, a face looking proximate to directly at the imaging device may be normalized to a frontal orientation. Alternatively, a face oriented mostly at a left or right profile may be normalized, respectively, to a left or right profile. In some embodiments, a number of orientation positions are set on the horizontal axis between left, frontal, and right. Additionally, vertical axis positions may be detected to produce additional orientations of faces looking down, straight, and upwards. Depending on the embodiment, vertical and horizontal orientation may be combined and/or separated or excluded from the final set of one or more normalized images making up a faceprint 245.

After the faceprint server 235 creates the one or more normalized images from the facial image, the normalized images are processed as face candidates for a faceprint 245 representing the associated unique ID. In one example embodiment, face candidates are compared to reference images already included in the user's faceprint 245. In instances where face candidate orientation (e.g., horizontal/vertical bias) is unknown, an initial comparison between each reference image in the faceprint 245 having a known orientation may indicate the orientation of the face candidate. For example, if the faceprint 245 contains a frontal image and a range of side images, distances to those images may be calculated for the face candidate. If the face candidate distance to the frontal image is less than the adjacent side image, it may be assumed that the face candidate represents a view of, or a view oriented closer to the frontal image. Alternatively, if a normalized image orientation is known, it may only be compared to images in the faceprint having the same orientation or a subset of the images in the faceprint at and/or adjacent to the known orientation.

In some embodiments, the faceprint server 235 converts a 2D image into a 3D model. For example, in one example embodiment, localized facial images are converted to normalized 3D models. By rotating the 3D model, a number of 2D image orientations may be simulated and subsequently captured by the faceprint server 235. In some instances, specific orientations of the 3D model are simulated based on the orientation images the simulated 2D capture will be compared to. For example, if each faceprint 245 contains a frontal image and two images each rotated 45 degrees from the frontal orientation, the 3D model may be used to generated rotated images from a single frontal image to populate a faceprint. For example, orientation may be determined responsive to a set of specified orientations and/or the most common orientations of images in a set of faceprints. The 2D image captures of the 3D model may be processed as candidate images.

As described above, the faceprint server 245 calculates distances between the candidate image and existing faceprint images. The distance between the candidate image and an existing faceprint image may include many distances calculated for multiple features, which may be weighted and combined to produce a single combined distance. Embodiments of some distance calculations between images, such as differences of DCTs and/or motion fields, are outlined in co-pending U.S. application Ser. No. 13/706,370, "Motion Aligned Distance Calculations for Image Comparisons" and may be used in conjunction with the embodiments described herein.

In one example embodiment, the determined distance between the candidate image and a faceprint image indicates their degree of similarity (e.g., the closeness of the images as a distance). If the candidate image of a given user is essentially the same (e.g., below a threshold distance) as a faceprint image it is compared to from the same user, it would be redundant information in the faceprint 245. In other words, the candidate image would not contribute any further features having value for performing a recognition using the faceprint 245.

The faceprint server 235 may reject redundant face candidates to minimize the number of images in a faceprint while retaining data valuable for recognitions. In some instances, however, a presence rate for the faceprint image may be increased if the candidate is rejected for being essentially the same. Faceprint images with high presence rates indicates that the user's face frequently appears in received images 255 with features identifiable or similar to that image in the faceprint.

If the candidate image is similar to a faceprint image, but not identical (e.g., above a threshold distance), it may be useful for facial recognitions as the features that are unique may not currently be represented by any images in the faceprint 245. However, if those features in the candidate image are similar to many other images in other users' faceprints 245, the recognition value of the candidate image decreases.

The faceprint server 235 may determine the recognition value of the candidate image by comparing it to one or more images in other users' faceprints 245. To that end, the faceprint server 235 determines a set of distances between the candidate image and images in the other users' faceprints 245. If many (e.g., greater than a 20% threshold) of the distances indicate that the candidate image is similar to the other users' faceprints 245, its recognition value may determined to be poor. Accordingly, the faceprint server 235 may discard the candidate. Alternatively, if few (e.g., less than 20%) of the distance indicate that the candidate image is similar to those in the other users' faceprints 245, it may be selected for use in the user's faceprint 245.

In some embodiments, the faceprint server 235 determines and stores a set of distances between each image using in the user's faceprint 245 and other users' faceprints 245. The faceprint server 235 selects one or more of the user's faceprint images most similar (e.g., according to distance) to the candidate image (e.g., at the same orientation, etc.). If the set of distances calculated for the candidate image indicates a greater recognition value than a most similar image in the faceprint 245, the faceprint server 235 replaces the most similar image with the candidate image to increase the recognition value of the faceprint 245.

Thus, by comparing the sets of distances, a metric of usefulness for the candidate image and images in the faceprint for recognition of a particular user's face is determined. For example, if the candidate image and/or image in the faceprint is similar to a number of faceprint images stored for other users, it may not be useful as a unique representation for identification due to a high rate of false positives. Alternatively, if the candidate image and/or image in the faceprint differs from the faceprints of other users, it serves as a unique representation for identification of the user.

In some embodiments, the faceprint server 235 determines which other users are likely to appear in images 255 captured/uploaded by a specific user or device. For example, a particular user may generally upload images of family members, if the image was taken with a cell or mobile phone and co-workers if the image was taken with a digital camera. The faceprint server 235 may determine the likelihood of one or more users to appear in an image 255 from a specific user or device based on an analysis of previously tagged or identified users within images captured/uploaded by the user. People likely to appear in an image associated with the specific user or device may be determined from a database storing relationships between devices, users appearing within images, etc.

In some embodiments, the connections between users are inferred from a social graph retrieved for one or more users. Accordingly, social networking users appearing within the images may have associated unique IDs within the social network. The faceprint server 235 stores the established relationships of the users according to identified co-appearances in images 255 and social interactions such prior recognitions resulting in co-taggings, linking, geographical proximity, check-ins, etc., of one or more users.

By determining which users are likely to appear within an image, the faceprint server 235 reduces the pool of other users' faceprints a given user's faceprint needs to be differential from (e.g., unique when compared to) for a positive recognition result of users within the image. Thus, the user's faceprint can be distinct within a specific pool or network of faceprints the user commonly uses to recognize images collected by the user, but not within the entire realm of created faceprints. In order to optimize recognitions of the user by their faceprint within a network of faceprints, the faceprint server 235 detects whether two faceprints (or reference images therein) within the network are similar. The faceprint server 235 may recalculate select faceprints within the network to optimize the recognition of one or more users.

Furthermore, in some embodiments, as faceprints of different users become more distinct, less computational analysis is needed for a positive recognition. For example, the recognition process may be conducted as a two step comparison of the facial image and faceprint images. Thus, if compared faceprint images are different enough from each other, an identification of the facial image may be made in the first, less computationally expensive processing step. Accordingly, the second step, though more accurate, may ultimately be avoided in many cases to reduce the amount of computations.

In some embodiments, the faceprint server 235 determines whether to include a faceprint candidate or keep an existing image in a faceprint based on the distances between the image (candidate or existing) to other images and the presence rate of the image. In one example embodiment, inclusion of an existing image in the faceprint is dependent on both its presence rate and distances to other images. Recall that the presence rate indicates how often an image in the faceprint is used to positively identify detected faces. For example, if an image is relatively unique to the user (e.g., not close to other users) but does not exhibit a high presence rate (or have any presence if a new candidate) compared to other images in the faceprint, it may be stored, but withheld from the faceprint until attaining a threshold presence rate relative to the other images in the faceprint. In some embodiments, withholding face candidates until achieving a threshold level of presence reduces the potential for including erroneous facial images in faceprints. Additionally, if the candidate/template has high presence, but is not unique to the user it may be included, but require additional comparisons for accurate recognition.

In one example embodiment, the faceprint server 235 supplements a user's faceprint with reference images that are both unique and have presence. Images with presence that are not unique may provide false positive recognition results. Conversely, images that are unique but have little presence recognize few images. The combination of these qualities defines the recognition value of a particular reference image in a faceprint 245. The faceprint server 235 may supplement a faceprint 245 with simulated reference images that combine the qualities of high presence rate and uniqueness compared images in other faceprints. In an example embodiment, the faceprint server 235 converts a 2D reference image to a 3D models based on its recognition value. From the 3D model, the faceprint server 235 generates 2D image captures (for use as new reference images in the faceprint) to replace and/or supplement reference images in the faceprint 245 with a lower recognition value or to generate a reference image at an orientation missing from the faceprint.

The faceprint server 235 delivers faceprints 245 to client devices 205 which use the faceprints to recognize objects at the client device. In one example embodiment, faceprints delivered to a client device 205 may be unique to the user of the client device 205 or client device itself. For example, the delivered faceprints may be optimized for faces which are likely to appear within the user's images and further by those the client device 205 is likely to process as described above.

In another embodiment, faceprints delivered to a client device 205 may be optimized based on client device 205 hardware and/or software parameters. For example, the number of faceprints (e.g., filtering of user less likely to appear in captured images) and/or number of reference images (e.g., only including images in faceprints with relatively high presence rates) in each faceprint may be reduced for mobile device client devices 205. In some embodiments, the client device 205 includes acceleration for one or more facial recognition processing methods. Thus, the faceprint server 235 may filtered out images incompatible with the acceleration techniques available to the client device 205. For example, if a reference image in the faceprint is similar to many other faceprints based on distances determined using the accelerated recognition processing; the image may be excluded from the delivered faceprint. Further, those reference images most different from other images based on distances determined using the accelerated recognition process are included in the delivered faceprint. In one example embodiment, the faceprint server 235 assigns weights to presence rates, distances, likeliness to appear and acceleration distances which are analyzed to determine ranks for each reference image within a faceprint delivered to the client device 205. The delivered faceprints 245 includes the highest ranked images based on weightings for optimal recognition of faces at the client device 205.

As shown in FIG. 2, the client device 205 includes a recognition module 210 that can interface with hardware on the client device 205 to perform facial localization, comparisons and recognitions. The recognition module 210 may include various other program modules with computer program instructions for facial processing at the client device 205 such as those detailed in co-pending U.S. application Ser. No. 13/706,370, "Motion Aligned Distance Calculations for Image Comparisons". To recognize a detected face in an image 255A, the recognition module 210 includes an optimized faceprint module 215 to store one or more optimized faceprints for identifying the detected face. Facial recognition may be performed at the client device 205 by calculating distances between the detected facial image and reference images from faceprints 245 stored by the faceprint module 215. As described previously, the calculated distances are compared to a threshold to determine whether the detected face is recognized by a reference image in a faceprint 245. Further, in some embodiments, specific processes are left out or emphasized based on the accelerations available on different client device devices 205.

Facial recognition performed by the recognition module 210 using stored faceprints may occur in real-time or as a post processing step. In one example embodiment, the client device 205 analyzes real-time data received from an image sensor, such as a CCD or CMOS, to detect the presence of a face. Once a face is detected, it may be localized, normalized, and then identified/recognized using the reference images in a faceprint as described herein. Further, once the face is detected, it may be tracked and labeled with its identity (e.g., the identity associated with the faceprint used to recognize the detected face) in real-time or stored with any pictures and/or videos captured from the image sensor. Thus, the recognition and/or localization may be used to automatically tag, annotate, or categorize the image based on the faceprints identifying detected faces in the image and indicate the location/boundaries of the detected faces.

Additionally, with real-time processing, the recognition module 210 may inject localization and/or identification information into the live-viewfinder display on the device. In embodiments where the recognition module 210 analyzes image sensor data as a post processing step, any of the above features may be performed on the stored data to localize, identify, and tag captured data from the image sensor. Processed and/or unprocessed images may be used as images 255 to improve future recognitions of faces contained therein. Thus, the client device may receive new faceprints and/or updates to stored faceprints for future recognitions. In one possible embodiment, when the process of recognizing an input facial image returns negative result, the client device 205 may transmit the image and any associated data to the faceprint server 235 to be used for identifying an existing faceprint not at the client device or creating a new faceprint from the facial image.

Figure 3:
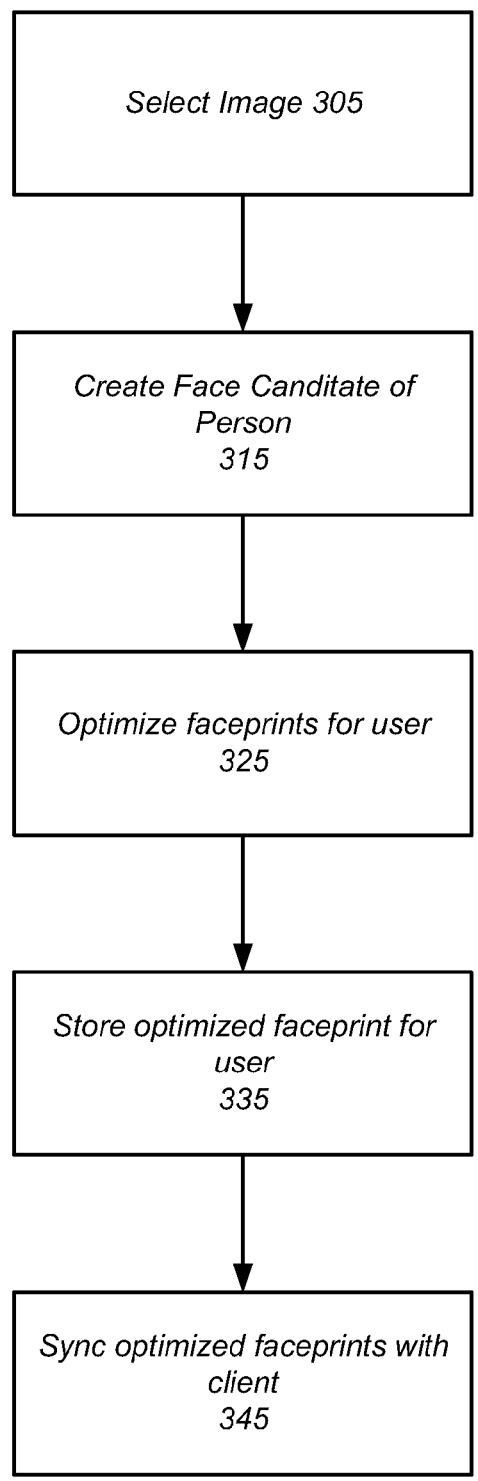
FIG. 3 is a flow-chart illustrating faceprint creation and optimization according to one example embodiment.

FIG. 3 is a flow-chart illustrating faceprint creation and optimization for persons performed by the faceprint server 235 according to one example embodiment. Other embodiments can perform the steps of the method in different orders and can include different and/or additional steps. In addition, some or all of the steps can be performed by entities other than the faceprint server 235.

The faceprint server 235 selects 305 an image responsive to determining that the image has tags, at least one tag indicating that a user is in the image, and a face of the user is detected. The face of the user (e.g., a person) is then localized in the image and optionally extracted. The faceprint server 235 creates 315 a face candidate of the person's face by normalizing the detected facial image. The face candidate is then compared to existing reference faceprint images of the person. The faceprint image(s) having the closest distances to the face candidate are determined.

The faceprint server 235 optimizes 325 the faceprint of the person by analyzing the reference faceprint images having the closest distances and the candidate image. If the face candidate is determined to be identical (e.g., below a first threshold distance) to a faceprint image of the person, a presence rate for the faceprint image is increased and the face candidate discarded. If the face candidate is determined to differ (e.g., above the first threshold distance) from the closest faceprint images of the person, the faceprint server 235 may determine distances between the face candidate and other persons' faceprints. Further, the faceprint server 235 may determine distances between the closest faceprint images and other persons' faceprints. If the distances between the face candidate and other persons' faceprints are greater (e.g., as an average or for a subset with distances close to the closest faceprint images) than one or more closest faceprints, the face candidate may be included in the faceprint.

In some embodiments, the faceprint server 235 may also optimize 325 the faceprint of the person responsive to other persons identified as most likely to appear in a same image as the user and/or those most likely to appear in an image captured by the user. Thus, comparisons between face candidates/faceprint images and other users' faceprints may be restricted to only those likely to perform a recognition. Further, the persons identified as likely to appear with the user or in images of the user may form a faceprint network for the user. Comparisons between faceprints in the network may occur at defined intervals to optimize recognition at the user's client device 205 and/or of the user. Accordingly, a network of faceprints may be stored specific to the user to best recognize the user and recognize persons in images captured at the user's client device 205. Further, embodiments may also optimize faceprints according to client device 205 hardware specifications and/or other processing techniques.

Once a faceprint and/or set of (e.g., optimizations for other users or a network) are optimized, the faceprint server 335 stores them in a database of faceprints. In one example embodiment, faceprints for persons most likely to appear with the user or appear in an image taken by the user/device are stored in association with a unique ID representing the user and, optionally the device. The faceprint server 235 may subsequently sync 345 optimized faceprints with the client device 205. The faceprint server 235 may delta sync only updated faceprints or full sync all faceprints over the network with the client device 205. For example, if any updates occur to the user's recognition network of faceprints, the updated faceprint data may be pushed to the client device 205 and other client devices containing the outdated faceprint data.

Figure 4A:
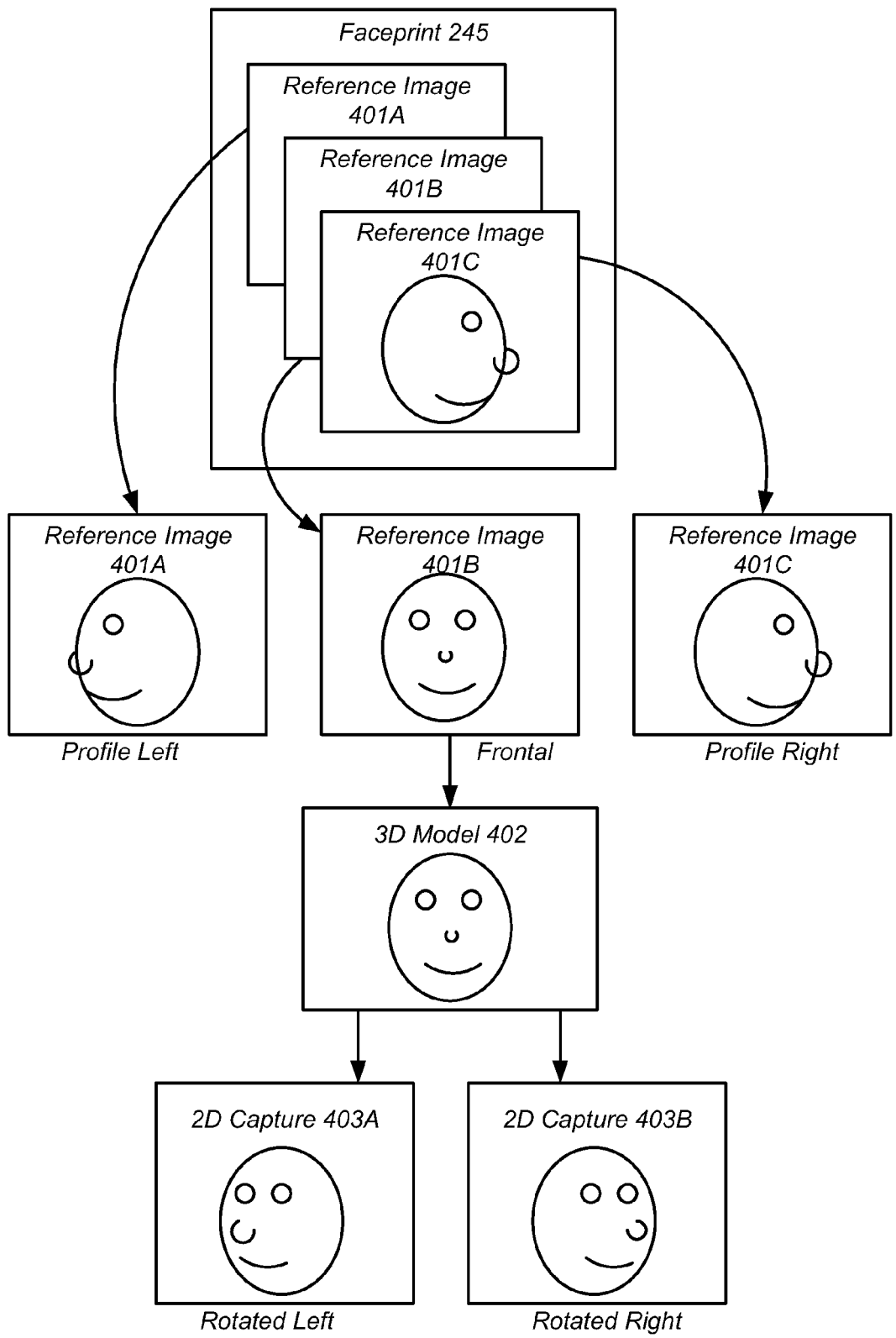
FIG. 4A illustrates an example situation for supplementing a user's faceprint using 2D captures from a 3D model, according to one example embodiment.

FIG. 4A illustrates an example situation for supplementing a user's faceprint using 2D image captures from a 3D model, according to one example embodiment. A faceprint 245 may include several reference images 401 for recognizing a facial image. Oftentimes, an orientation of the face in a reference image, useful for identifying a person or object, may be missing from the faceprint 245. For example, faceprint 245 includes reference images with a left profile 401A, fontal view 401B, and a right profile 401C. Typically, a faceprint 245 includes several intermediate orientations for recognizing facial images. Rather than wait for those images to be collected or request a user to collect the images, the faceprint server 235 may generate a 3D model 402, for example, of the frontal view reference image 401B.

With the 3D module 402 generated, the faceprint server 235 may rotate the model from the frontal orientation.

Accordingly, 2D captures 403, at desired degrees of rotation, may be captured to supplement the reference images 401. For example, as shown, 2D captures are taken at a rotated left 403A and a rotated right 403B orientation to aid in recognition of facial images having an orientation between the frontal view 401B and profile views 401A, 401C. Typically, when the faceprint 245 contains many images, a reference image 401 having a closest orientation to the missing orientation to be supplemented with a 2D capture 403 is selected to generate the 3D model. A method for generating 2D image captures from a 3D model is described in greater detail with reference to FIG. 4B.

Figure 4B:
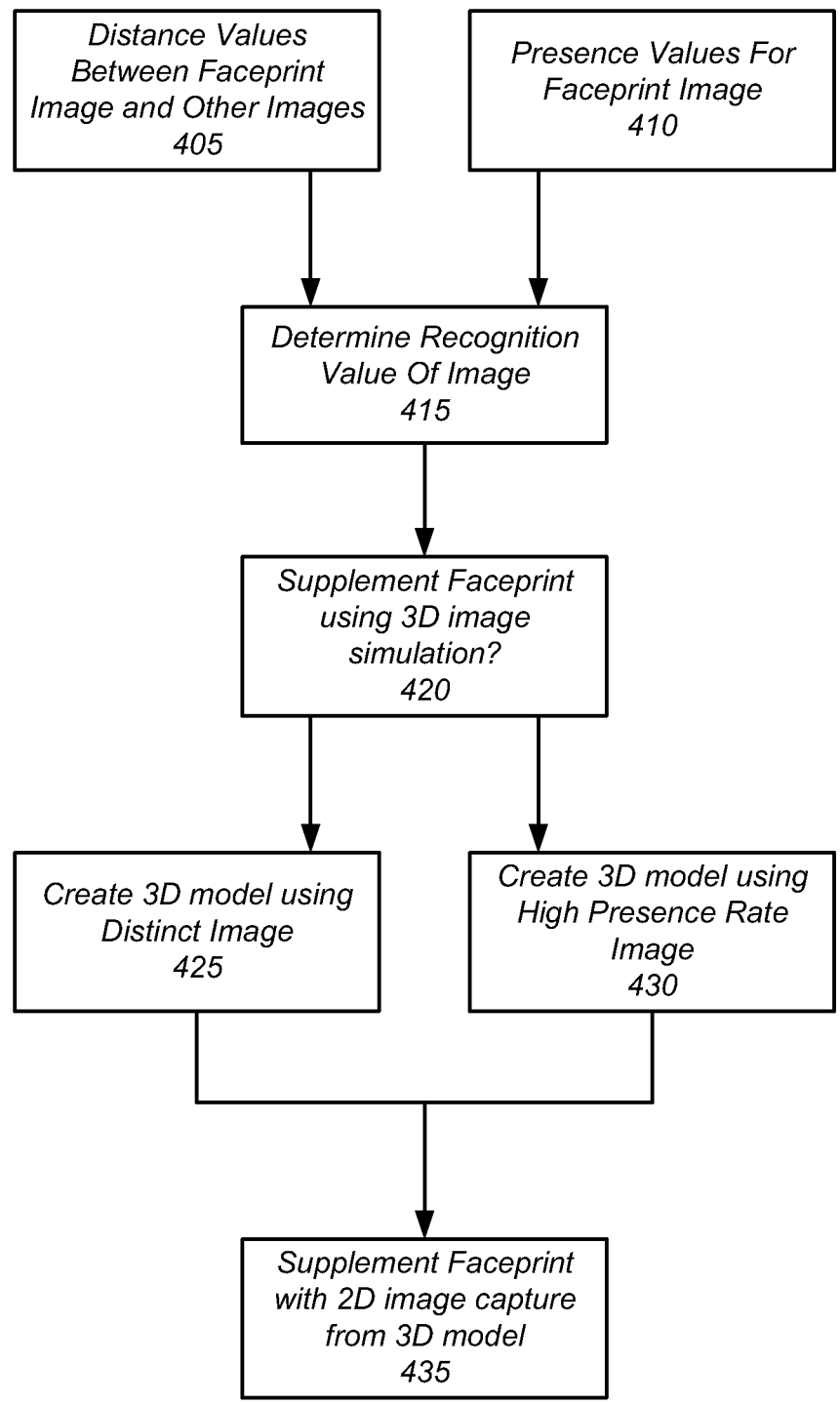
FIG. 4B illustrates a method of 3D image estimation for generating 2D image captures for 2D recognition, according to one example embodiment.

FIG. 4B illustrates a method of 3D image estimation for generating 2D image captures for 2D recognition, according to one example embodiment. For example, an image in a faceprint with high presence rates 410 and/or large distances values to images in other faceprints 405 may be converted to 3D models based on their recognition value 415.

The 3D model may be used (as discussed previously) to produce 2D images of different orientations of the 3D image. Thus, images having the greatest recognition value may be used to supplement other images within the faceprint. For example, simulated 2D orientation may be used to fill in missing orientations and/or replace reference images within the faceprint that are not as useful for recognitions.

In one example, if a first image within the faceprint has a very high presence rate but low distance value to one or more images in other faceprints. Accordingly, a second image within the faceprint may be chosen 425 that has a greater distance to the other faceprints (and thus greater recognition value) to supplement 420 comparisons in recognitions using the first image.

A 3D model is determined for the second image with a greater distance and a supplementary 2D capture 435 is taken at the orientation of the image with the high presence rate. The supplementary image (e.g., the 2D capture) may be used during comparisons in conjunction with the image with high presence rates.

For example, an image being compared to the first image with the high presence rate may also be compared to the supplementary image. Accordingly, two distances may be determined and weighted to form a single distance and/or compared to one or more thresholds to determine which value represents the comparison (e.g., for a recognition or rejection) for an accurate distance.

Additionally, the above logic may also be applied in reverse. Specifically, captures from a 3D model created 430 for an image with high presence rates may supplement 435 images in a faceprint with larger distances to images in other faceprints. In some embodiments, images with high presence rates may act as an initial filter before calculating a supplementary distance. Initial comparisons/filtering using high-presence images may consist of using images down sampled (e.g., 2× or 4×) by size and/or resolution.

Additional Considerations

Certain embodiments are described herein as including logic or a number of components, modules, or mechanisms, for example, as illustrated and described with FIG. 2. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client device or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Some portions of this specification are presented in terms of algorithms or symbolic representations of operations on data stored as bits or binary digital signals within a machine memory (e.g., a computer memory 104), for example, the process described with FIG. 3. These algorithms or symbolic representations are examples of techniques used by those of ordinary skill in the data processing arts to convey the substance of their work to others skilled in the art.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one example embodiment" or "an example embodiment" means that a particular element, feature, structure, or characteristic described in connection with the embodiment is included in at least one example embodiment. The appearances of the phrase "in one example embodiment" in various places in the specification are not necessarily all referring to the same embodiment.

Upon reading this disclosure, those of skill in the art will appreciate still additional alternative structural and functional designs for a system and a process for facial recognition through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope of the disclosure.

What is claimed is:

1. A computer-implemented method for optimizing a faceprint of a given user comprising a plurality of reference images for performing facial recognition at a client device, the optimization comprising:
   calculating one or more distances between a face candidate and the plurality of reference images of the faceprint of the given user in a plurality of users, the face candidate evaluated to determine an optimized faceprint for the client device;
   selecting a set of reference images in the plurality of reference images having one or more minimal distances to the face candidate;
   calculating distances between the face candidate and reference images in faceprints of other users in the plurality of users, and between the set of reference images and the reference images in the faceprints of other users in the plurality of users;
   selecting from the face candidate and the set of reference images, a reduced set of reference images having one or more greatest distances to the reference images in the faceprints of other users in the plurality of users; and
   providing the reduced set of reference images to the client device in the optimized faceprint, wherein the reduced set of reference images having one or more greatest distances to the reference images in the faceprints of other users in the plurality of users reduces a number of comparisons that provide false positive recognition results.

2. The computer-implemented method of claim 1, wherein the face candidate is a new image of the given user.

3. The computer-implemented method of claim 1, wherein selecting the set of reference images in the plurality of reference image having one or more minimal distances to face candidate comprises identifying an approximate orientation of the candidate image based on the orientation of a closest reference image.

4. The computer-implemented method of claim 1, wherein the face candidate is rejected if a minimal distance to a reference image is lower than a threshold, the threshold indicating that the face candidate does not provide additional recognition value as a reference image.

5. The computer-implemented method of claim 4, wherein a presence rate for the reference image with the minimal distance is increased in response to rejection of the face candidate, the presence rate indicating the recognition value of the reference image.

6. The computer-implemented method of claim 1, wherein calculating distances between the face candidate and reference images in faceprints of other users in the plurality of users is performed within a network of users having faceprints likely to be used to perform a recognition in images captured at the client device.

7. The computer-implemented method of claim 6, wherein the network of users is determined from an analysis of a social graph of the user and users frequently identified in images captured by the user at the client device.

8. The computer-implemented method of claim 6, wherein providing the reduced set of reference images to the client device in the optimized faceprint comprises an update of the network of users having faceprints likely to be used to perform a recognition in images captured at the client device.

9. The computer-implemented method of claim 1, further comprising an analysis of the reduced set of reference images to identify a missing orientation of the user's face and generating a supplementary reference image at the missing orientation, the generating comprising:
   selecting, from the reduced set of reference images, a reference image having an orientation closest to the missing orientation;
   creating, from the reference image, a 3D facial representation of the user; and
   rotating the 3 dimensional representation to the missing orientation to capture a 2 dimensional image for supplementing the reduced set of reference images.

10. A system for optimizing a faceprint of a given user comprising a plurality of reference images for performing facial recognition at a client device, the system comprising:
    a faceprint server configured to optimize the faceprint of the given user within a plurality of users, the optimization comprising steps to:
       calculate one or more distances between a face candidate and the plurality of reference images of the faceprint of the given user in the plurality of users, the face candidate evaluated to determine an optimized faceprint;
       select a set of reference images in the plurality of reference images having one or more minimal distances to the face candidate;
       calculate distances between the face candidate and reference images in faceprints of other users in the plurality of users, and between the set of reference images and the reference images in the faceprints of other users in the plurality of users; and
       select from the face candidate and the set of reference images, a reduced set of reference images having one or more greatest distances to the reference images in the faceprints of other users in the plurality of users, the optimized faceprint for the user comprising the reduced set of reference images; and
    a recognition module configured to receive the optimized faceprint and the faceprints for the plurality of other users for recognizing one or more of the users in images captured at the client device, wherein the reduced set of reference images having one or more greatest distances to the reference images in the faceprints of other users in the plurality of users reduces a number of comparisons that provide false positive recognition results at the recognition module.

11. The system of claim 10, wherein the face candidate is a new image of the given user received from the recognition module.

12. The system of claim 10, wherein selecting the set of reference images in the plurality of reference image having one or more minimal distances to face candidate comprises identifying an approximate orientation of the candidate image based on the orientation of a closest reference image.

13. The system of claim 10, wherein the face candidate is rejected if a minimal distance to a reference image is lower than a threshold, the threshold indicating that the face candidate does not provide additional recognition value as a reference image.

14. The system of claim 13, wherein a presence rate for the reference image with the minimal distance is increased in response to rejection of the face candidate, the presence rate indicating the recognition value of the reference image.

15. The system of claim 10, wherein calculating distances between the face candidate and reference images in faceprints of other users in the plurality of users is performed within a network of users having faceprints likely to be used to perform a recognition in images captured at the client device.

16. The system of claim 15, wherein the network of users is determined from an analysis of a social graph of the user and users frequently identified in images captured by the user of the client device.

17. The system of claim 15, wherein providing the reduced set of reference images to recognition module in the optimized faceprint comprises an update of the network of users having faceprints likely to be used to perform a recognition in images captured at the client device.

18. The system of claim 10, further comprising an analysis of the reduced set of reference images to identify a missing orientation of the user's face and generating a supplementary reference image at the missing orientation, the generating comprising:
- selecting, from the reduced set of reference images, a reference image having an orientation closest to the missing orientation;
- creating, from the reference image, a 3D facial representation of the user; and
- rotating the 3 dimensional representation to the missing orientation to capture a 2 dimensional image for supplementing the reduced set of reference images.

\* \* \* \* \*